United States Patent
Vetruba

[19]

[11] Patent Number: 6,000,524
[45] Date of Patent: Dec. 14, 1999

[54] APPARATUS FOR ORIENTING RANDOMLY ORGANIZED ARTICLES

[75] Inventor: Tracy K. Vetruba, St. Cloud, Minn.

[73] Assignee: The Pillsbury Company, Minneapolis, Minn.

[21] Appl. No.: 08/935,045

[22] Filed: Sep. 22, 1997

[51] Int. Cl.[6] .................................................. B65G 47/24

[52] U.S. Cl. .......................... 198/400; 198/416; 198/383; 198/399

[58] Field of Search ..................................... 198/383, 394, 198/400, 402, 410, 416, 633, 638, 636, 399

[56] References Cited

U.S. PATENT DOCUMENTS

| | | |
|---|---|---|
| 1,445,899 | 2/1923 | McGregor . |
| 2,775,334 | 12/1956 | Jeremiah . |
| 2,831,564 | 4/1958 | Pavesi . |
| 3,300,021 | 1/1967 | Holmes ..................................... 198/33 |
| 3,326,556 | 6/1967 | Andersen ................................. 273/103 |
| 3,342,011 | 9/1967 | Cox et al. ..................................... 53/59 |
| 3,721,328 | 3/1973 | Drew ....................................... 198/635 |
| 3,726,387 | 4/1973 | Krooss ................................. 198/416 X |
| 3,876,064 | 4/1975 | Morton ................................. 198/400 X |
| 3,993,187 | 11/1976 | Knez ........................................... 47/24 |
| 4,471,865 | 9/1984 | Johnson ............................... 198/410 X |
| 4,503,966 | 3/1985 | Papalexis et al. ........................... 47/24 |
| 4,563,944 | 1/1986 | Tate ............................................ 37/12 |
| 4,690,266 | 9/1987 | Croman et al. .............................. 47/24 |
| 4,832,174 | 5/1989 | Frisbie .................................... 198/384 |
| 4,953,343 | 9/1990 | Hellman ...................................... 35/44 |
| 5,131,937 | 7/1992 | Kuster ........................................ 35/16 |
| 5,169,664 | 12/1992 | Ueno et al. . |

FOREIGN PATENT DOCUMENTS 582963  2/1994  European Pat. Off. ............... 198/416

OTHER PUBLICATIONS

"Product Turn–Over Device" by D. C. Teale for IBM Technical Disclosure Bulletin vol. 27 No. 1B, Jun. 1984.

*Primary Examiner*—James R. Bidwell
*Attorney, Agent, or Firm*—Westman, Champlin & Kelly, P.A.

[57] ABSTRACT

An apparatus for orientating randomly organized articles formed of spaced planar members coupled along an edge of the planar members to define an opened end and a closed end along the edge where the planar members are coupled. The apparatus includes a conveyor for moving articles along a conveyor path between first and second positions, and at least one elongated member extending across the conveyor between first and second positions. The elongated member is aligned at an elevated height above a surface of the conveyor to define a gap between the member and the conveyor surface. The extent of the gap is sized greater than the thickness of the planar members and less than the height of the article formed by the planar members for orientating randomly organized articles.

20 Claims, 6 Drawing Sheets

APPARATUS FOR ORIENTING RANDOMLY ORGANIZED ARTICLES

BACKGROUND OF THE INVENTION

The present invention relates to an apparatus for orientating randomly organized articles along a conveyor path. In particular, the present invention relates to an apparatus for orientating articles along a conveyor path, relative to the shape and features of the articles.

Many manufacturing and assembling processes use automatic conveyor systems for transporting articles along a conveyor path to various assembly stations for processing. Articles may be deposited to the conveyor system in a randomly organized fashion. Depending upon the operation, it may be necessary to align the articles on the conveyor path in a uniform direction for processing. Articles may be aligned by an operator; however, this may slow the assembly process and increase assembly costs. Additionally, repetitive movement associated with aligning articles may cause health concerns for the operator. Thus, it is desirable to provide a mechanism for aligning randomly organized articles discharged to a conveyor system in a single uniform direction for processing or packaging.

SUMMARY OF THE INVENTION

The present invention relates to an apparatus for orientating randomly organized articles formed of spaced planar members coupled along an edge of the planar members to define an opened end, and a closed end along the edge where the planar members are coupled. The apparatus includes a conveyor for moving articles along a conveyor path between first and second positions. The apparatus includes at least one elongated member extending across the conveyor between first and second positions. The elongated member is aligned at an elevated height from a surface of the conveyor to define a gap between the member and the conveyor surface, the extent of the gap being sized greater than the thickness of the planar members and less than the height of the article formed by the planar members for orientating randomly organized articles. In particular, the member is designed depending upon the orientation of an article to restrict passage of the article or to flip the article under the member to shift the orientation of the article.

DETAILED DESCRIPTION OF THE PREFERRED EMBODIMENTS

Figure 1:
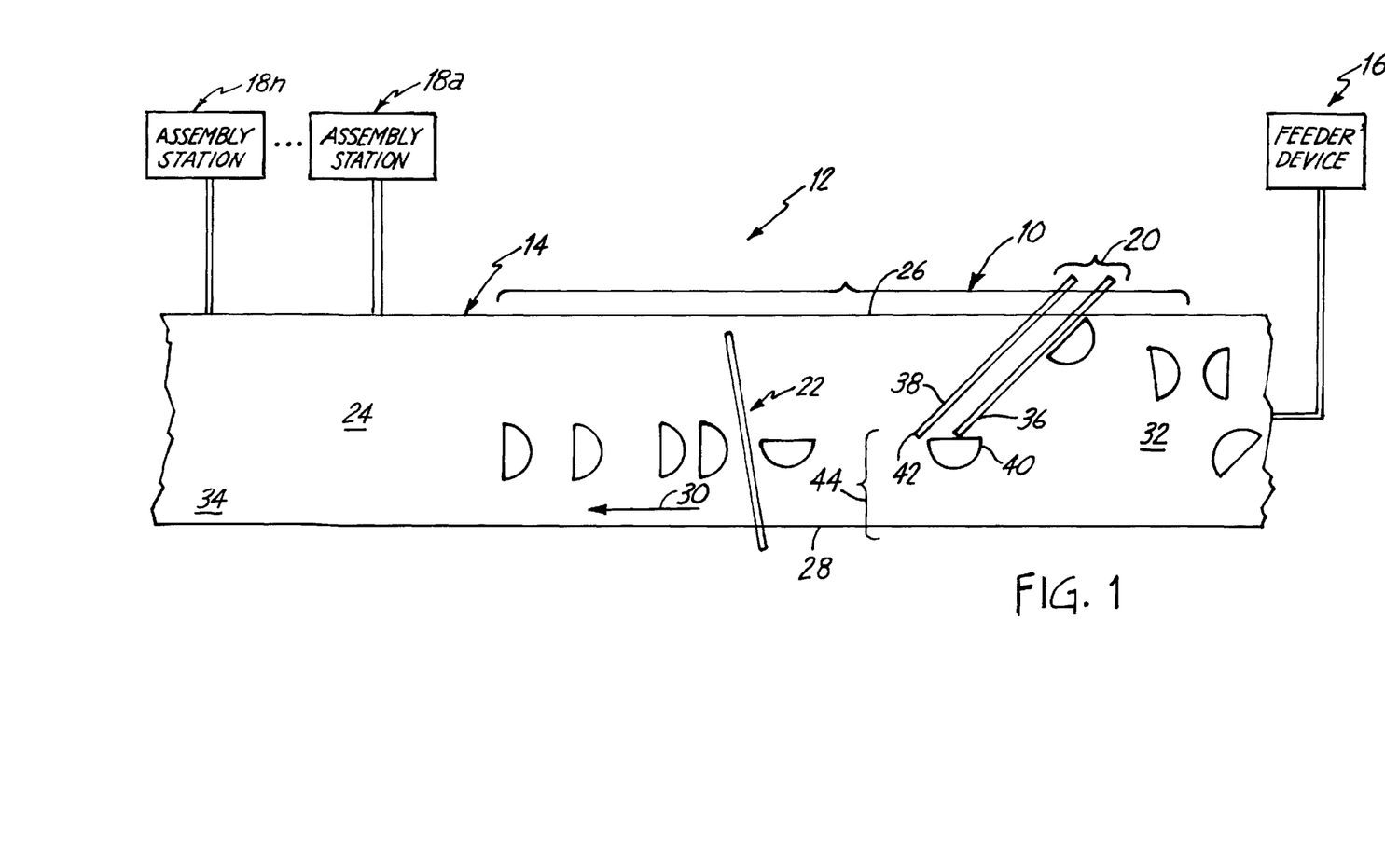
FIG. 1 is a plan view of an embodiment of an orientating assembly of the present invention.

FIG. 1 illustrates an orientating assembly 10 for use in an assembly system 12 for orientating randomly organized articles fed to a conveyor 14 from a feeder 16 for processing or packaging at station(s) 18a–18n along the conveyor 14. The orientating assembly 10 uses the shape and features of an article for orientating randomly organized articles in desired alignment for processing, as will be explained.

An embodiment of the orientating assembly 10 of the present invention includes conveyor 14, an alignment assembly 20, and an orientating member 22. The alignment assembly 20 aligns the randomly organized articles in a single direction, and the orientating member 22 positions the uniformly directed articles in a desired orientation for processing or packaging. Conveyor 14 includes a conveyor surface 24 extending between opposed sides 26, 28. Articles move along conveyor 14 in a direction illustrated by arrow 30, generally between first and second ends 32, 34 defining a conveyor path therebetween.

Randomly organized articles are fed to the first end 32 of the orientating assembly 10. The alignment assembly 20 includes spaced first and second alignment members 36, 38, spaced from the first end 32. Preferably, the spaced first and second alignment members 36, 38 are formed of elongated cylindrical rods which are supported at a predetermined elevation above the conveyor surface 24 via a support structure (not shown). The alignment members 36, 38 extend from side 26 to a distance spaced from side 28. Ends of the alignment members 36, 38, spaced from side 28, define discharge ends 40, 42. Gap 44 extends between discharge ends 40, 42 and side 28.

Randomly organized articles move along conveyor 14 from first end 32 to alignment members 36, 38 for uniform alignment thereby, as will be explained. Uniformly aligned articles are discharged from either end 40 or 42 of members 36, 38 depending upon the alignment of articles fed to conveyor 14, as will be explained and are further conveyed to orientating member 22. Preferably, orientating member 22 includes an elongated cylindrical rod which extends across the conveyor 14, generally between sides 26, 28 at an elevated height from the conveyor surface 24, for repositioning uniformly arranged articles to a desired orientation.

Figure 2:
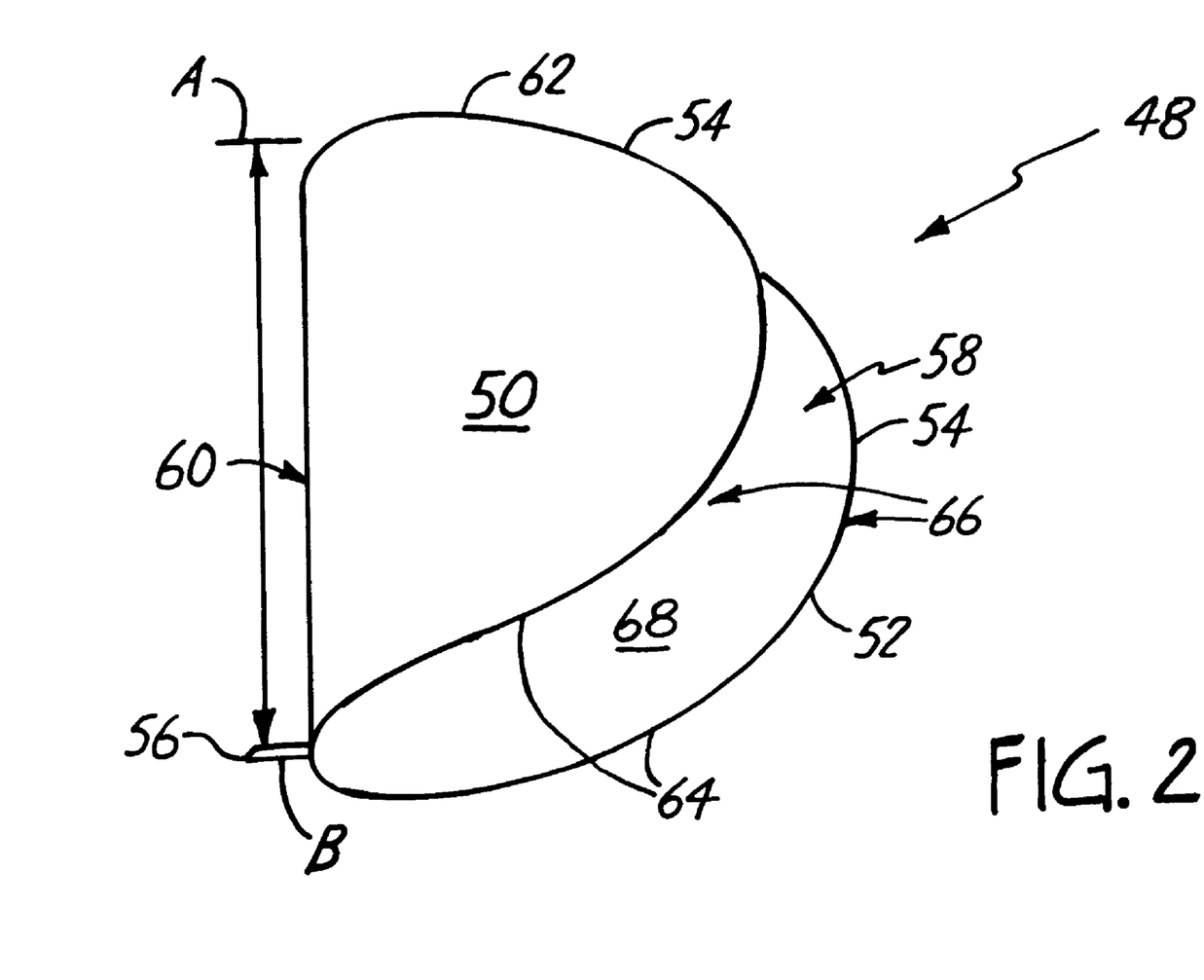
FIG. 2 is a perspective view of a taco shell which may be orientated by the orientating assembly of the present invention.

An embodiment of the present invention is particularly useful for orientating taco shells 48 in a single alignment for packaging. FIG. 2 illustrates an embodiment of a taco shell 48 which may be orientated by the present apparatus. As shown, the taco shell 48 in FIG. 2 includes first and second walls 50, 52, formed of generally planar members having a curved edge 54. An elbow 56 joins walls 50, 52 in spaced relation to define an opened end 58, having an opening, and a closed end 60. The closed end 60 has a generally flat surface extending from point A to point B along closed end 60. The curved edges 54 of spaced walls 50, 52 define opposed curved sides 62, 64 and curved tip 66, opened to an inner cavity 68. Sides of elbow 56 are slightly sloped so that the distance between walls 50, 52 increases from the flat closed end 60 to the curved tip 66. Thus, the height of the shell increases from the closed end 60 to the opened end 58.

Figure 3A:
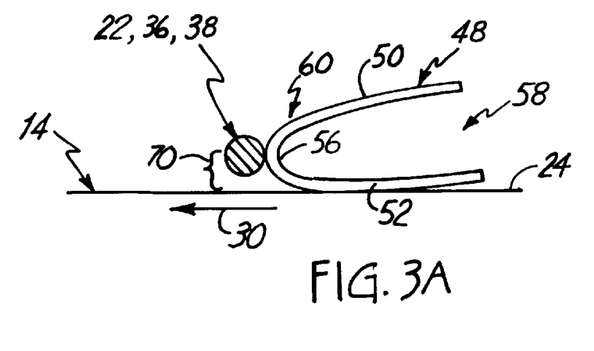
FIGS. 3A–3D illustrate operation of members for aligning randomly organized articles.

As illustrated in FIGS. 3A–3D, members 22, 36, 38 are elevated above conveyor surface 24 to define gap 70. The height of gap 70 between conveyor surface 24 and members 22, 36, 38 is larger than the thickness of walls 50, 52 so that either wall 50 or 52 may pass thereunder. As illustrated in FIG. 3A, gap 70 is less than height of elbow 56 so that passage of elbow 56 is restricted. Thus, as illustrated in FIG. 3A, if a shell 48 approaches members 22, 36, 38 with the closed end 60 aligned forward toward the second end 34 of conveyor 14, passage of shell 48 is restricted by members 22, 36, 38.

Figure 3B:
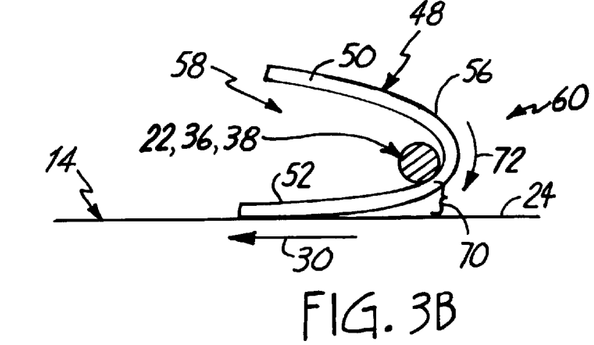
Figure 3C:
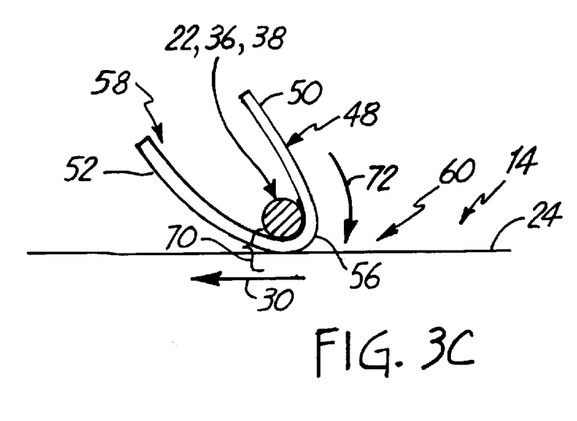
Figure 3D:
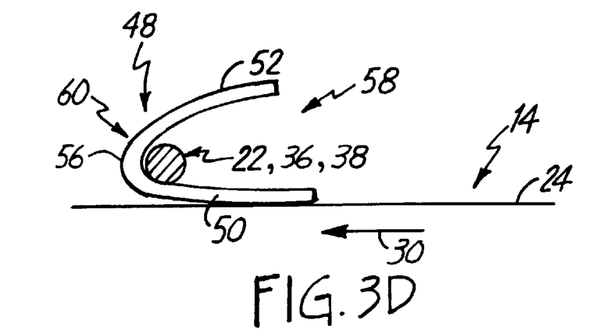

The height of gap 70 is higher than the thickness of the planar walls 50, 52 so that individual walls 50, 52 may pass thereunder. The height of members 22, 36, 38 is less than the opening between first and second walls 50, 52 at opened end 58 and the height dimension of members 22, 36, 38 corresponds approximately to the height of elbow 56. Thus, as illustrated in FIGS. 3B–3D, if shell 48 approaches members 22, 36, 38 with the opened end 58 aligned forward, wall 52, supported on the conveyor surface 24, will pass thereunder; and elevated wall 50, will pass above members 22, 36, 38. As the shell 48 is continually conveyed, members 22, 36, 38 extend into cavity 68 to contact shell generally at elbow 56. Continued movement of shell 48 after contacting elbow 56 will rotate shell 48, as illustrated by arrow 72, under the members 22, 36, 38, as progressively shown in FIGS. 3B–3D. Shell 48 rotates under members 22, 36, 38 via continued movement of conveyor 14 so that the orientation of shell 48 is flipped, and wall 50 is now supported on conveyor surface 24, and wall 52 is elevated above the conveyor surface 24. The closed end 60 is then generally aligned forward after the shell 48 is flipped by members 22, 36, 38 as illustrated in FIG. 3D.

The height of gap 70 and the dimensions of members 22, 36, 38 are sized according to the dimensions of the article (or taco shell) being oriented so that the height of the gap 70 is sufficient to allow the planar walls 50, 52 to pass thereunder and the height and dimensions of members 22, 36, 38 is sufficient to rotate the opened-end-58-forward shells 48 as illustrated by arrow 72. For example, for a taco shell 48 having an opened end 58 approximately 1 inch high; members 22, 36, 38 are elevated approximately ¼ inch from the conveyor surface 24 and members 22, 36, 38 are approximately ½ inch in diameter or height. It should be understood that the alignment members 22, 36, 38 are not limited to the cylindrical rod described and may be formed of an elongated rectangular member or other shaped members.

Taco shells 48 are deposited to the first end 32 of the conveyor 14 in random alignment. The random alignment includes taco shells 48 generally orientated with the closed end 60 facing forward toward second end 34, or generally orientated with opened end 58 facing forward toward second end 34. Other shells 48 will be orientated with sides 62, 64 of the shells facing forward toward second end 34. Alignment members 36, 38 cooperatively orientate the randomly organized articles in a uniform direction as will be described.

Figure 4:
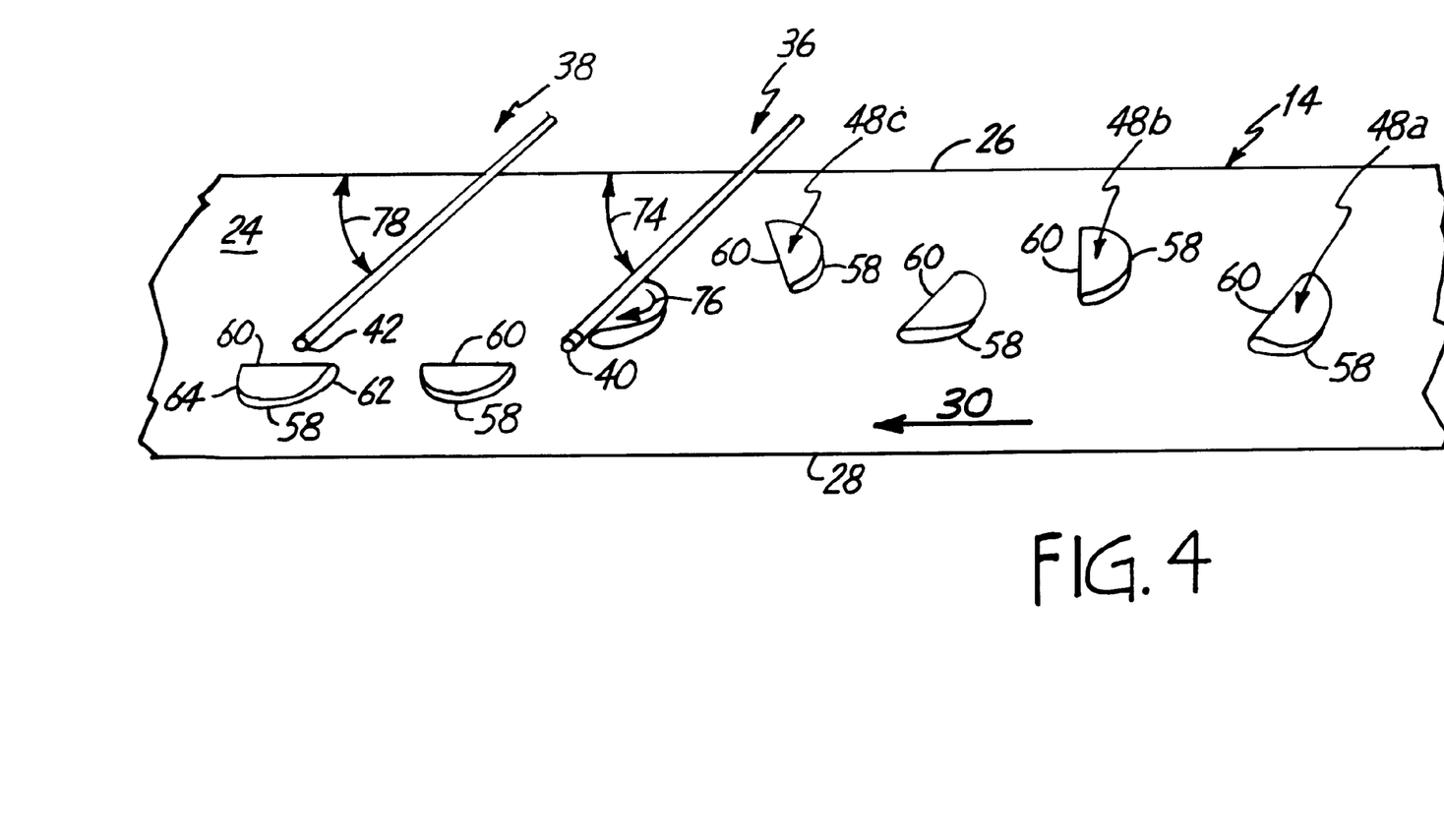
FIG. 4 is a plan view of randomly organized articles in a first orientation being aligned by orientating members.

FIG. 4 illustrates orientation of shells 48 having closed end 60 facing forward in the direction of motion of the conveyor 14 via members 36, 38. As shown, the taco shells 48 may be in any number of closed-end-60-forward positions, as illustrated by shells 48a–48c, as long as closed end 60 contacts member 36 as the shells 48 are conveyed along the conveyor path. As shown in FIG. 4, the conveyor 14 continuously moves shells 48a–48c along the conveyor path until closed end 60 contacts member 36. As previously illustrated in FIG. 3A, since the extent of gap 70 of elevated member 36 is less than the height of elbow 56 at closed end 60, movement of the shell 48 via the conveyor 14 is restricted by member 36.

As shown, member 36 is preferably angled as shown by reference 74 relative to side 26 (and to the conveyor path or direction) so that after shells 48a–48c contact member 36, and continued movement of conveyor 14 slides the shells 48 along the length of member 36 to discharge end 40. At discharge end 40, continued movement of the conveyor 14 rotates shells 48, as illustrated by arrow 76 so that closed end 60 is arranged parallel with the conveyor path facing side 26 and opened sides 62, 64 are aligned toward the first and second ends 32, 34, respectively, of the conveyor 14.

Rotation of the shells 48 occurs as the closed end 60, which is supported by member 36, slides off the end of member 36 and is moved along the conveyor path by the conveyor 14. After rotation, shell 48 moves along the conveyor 14 proximate to discharge end 40. The angle of reference 74 is operatively selected based upon how fast the conveyor is moving, so that shells 48 contact member 36, and are moved along the length of member 36 for discharge at end 40. The angle for moving shells 48 along member 36 is generally between 30° and 60°. Preferably, reference angle 74 is 45°.

Figure 5:
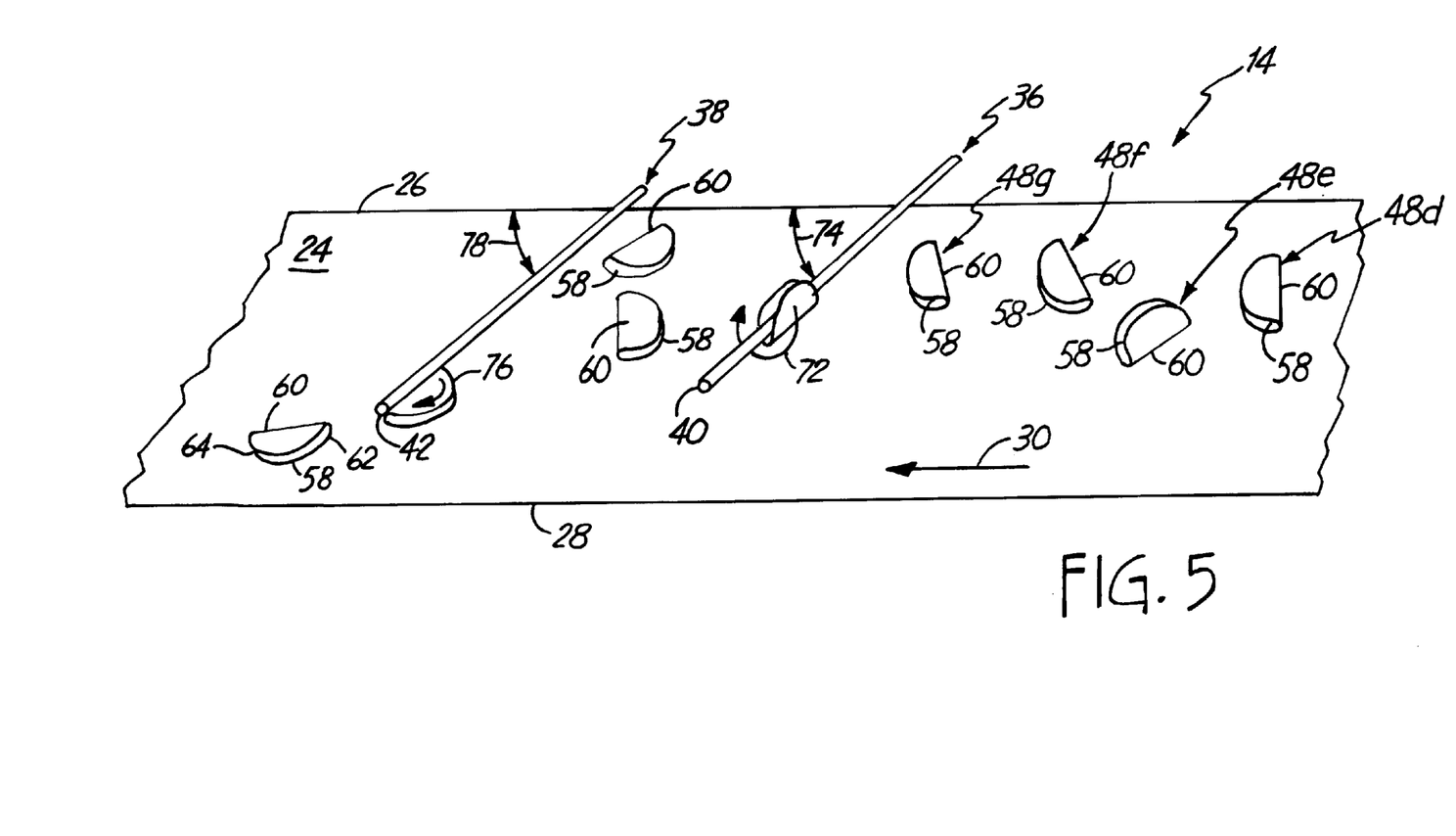
FIG. 5 is a plan view of randomly organized articles in a second orientation being aligned by orientating members.

FIG. 5 illustrates operation of members 36, 38 to uniformly orientate shells 48d–48g, having the opened end 58 aligned forward. Shells 48d–48g similarly move along the conveyor 14 toward member 36. As previously explained, the thickness of wall 50 or 52, supported by conveyor surface 24, is sized smaller than gap 70 and the height of wall 50 or 52 elevated above the conveyor surface is greater than the height of member 36. Thus, individual wall 50 or 52 supported on conveyor surface 24 moves through gap 70 under member 36 and elevated wall 50 or 52 moves over member 36 to advance member 36 into cavity 68. Member 36 is advanced into cavity 68 to contact shell at elbow 56. Member 36 restricts movement of shell 48 upon contact at elbow 56 causing the shell to flip or rotate under member 36 (as illustrated by arrow 72) via continuous movement of the conveyor 14. The shells are flipped so that previously elevated wall 50 or 52 is now supported by conveyor surface 24; and supported wall 50 or 52 is now elevated; and the orientation of the shells is changed so that the closed end 60 is aligned facing forward toward member 38. Thus, all of the opened-end shells 48d–48g are flipped to the closed-end orientation similar to that described in FIGS. 3B–3D.

The flipped shells 48, having the closed end 60 facing forward, are then aligned relative to member 38, in a similar fashion to that described for alignment of closed-end shells 48a–c relative to member 36 (FIG. 4), so that member 38 restricts passage of shells 48d–g (FIG. 5). Preferably, member 38 is similarly angled relative to side 26 as illustrated by reference 78, as is member 36 to move the closed-end-60-forward shells along member 38 for discharge at end 42. In a preferred embodiment, members 36 and 38 are essentially parallel, however, it should be understood that member 38 may be positioned at any operative angle for discharge of shells at end 42 and it is not necessary that members 36, 38 be parallel. At discharge end 42, the shells 48d–48g are rotated, as illustrated by arrow 76, so that the closed end 60 faces side 26 (parallel to the conveyor path) and opened sides 62, 64 are aligned toward the first and second ends 32, 34, respectively, of the conveyor 14.

The spacing between members 36, 38 is designed to provide sufficient space to orientate the shells 48 conveyed along the conveyor 14. Preferably, the spacing between the first and second alignment members 36, 38 is approximately one to two taco shell widths apart for a conveyor system moving at approximately 30 feet per minute. This spacing can be varied depending upon the speed of the conveyor.

Some shells 48, fed to conveyor 14, are orientated so that side 62 or 64 is aligned facing forward to the second end 34 and are not directly aligned with the opened end forward or the closed end forward. Depending upon the orientation of such shells 48, passage of the shells may be restricted by member 36 so that movement of the conveyor aligns the closed end of shell 48 with member 36 to slide shell 48 along member 36 for discharge at end 40. Other side aligned shells 48 may be flipped under member 36 as illustrated in FIG. 5 to align closed end with member 38 for discharge at end 42. Thus, as described, randomly aligned shells 48, discharged from either member 36 or member 38, are uniformly oriented, as illustrated in FIGS. 4 and 5, regardless of the orientation of the shells approaching members 36, 38.

Figure 6:
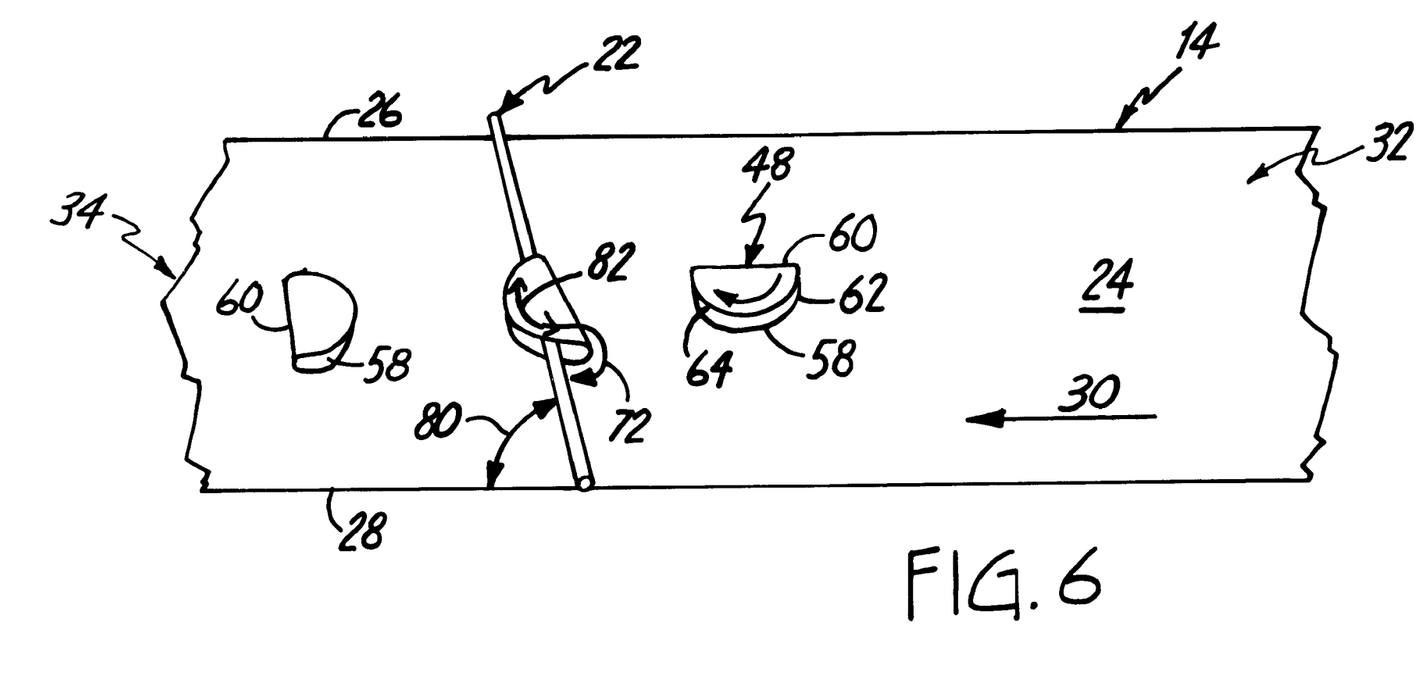
FIG. 6 is a plan view of operation of an orientating member for positioning uniformly aligned articles for processing or packaging.

Although the shells 48 are uniformly aligned by members 36, 38, it may be desirable to reposition the shells 48 to yet another desired orientation. In particular, in the case of the taco shells, it may be desired to orient the shells 48 so that the closed end 60 faces toward the second end 34. With the closed end facing toward the second end 34, multiple taco shells may be easily nested for packaging. As shown in FIG. 6, the shells 48 are orientated to the desired position via orientating member 22, extending generally between sides 26, 28 of conveyor 14. Member 22 is angled as illustrated by reference 80 relative to side 28 as will be explained. As previously explained, shells 48 are discharged from members 36, 38, having closed end facing side 26 and side 64 facing toward member 22, and are conveyed to member 22 in such alignment. The angle 80 of the alignment member 22 is operatively selected so that contact of shells 48 with member 22 facilitates rotation of the shells, as illustrated by arrow 82, via continuous movement of the conveyor 14 thereunder so that elbow 56 is generally flush with member 22. Preferably, angle 80 is approximately 75° to shift the orientation of the shells 48 approximately 90°.

Additionally as the shell 48 rotates, continued movement of shell 48 via conveyor 14 moves supported wall 50 or 52 under member 22, and elevated wall 50 or 52 over member 22 so that member 22 moves into cavity 68 to contact elbow 56, as illustrated in FIG. 6. Movement of shell is restricted via contact of member 22 with elbow 56 such that continued movement of conveyor 14 causes the shell 48 to flip, as illustrated in FIGS. 3B–3D via arrow 72, so that shell 48 is aligned with closed end 60 forward, as illustrated in FIG. 6. Thus, as described, shell 48 is rotated (arrow 82) and flipped (arrow 72) to align the closed-end-60 toward second end 34 for packaging or subsequent operation.

It should be understood that although the present invention is described with respect to orientating taco shells, it is possible that the concepts of the present invention may be used for uniformly aligning articles having similar features including an opened end, a closed end, a flat edge and a round edge. Although the invention is described with respect to a preferred article and preferred embodiments, it should be understood that the scope and content of the invention should only be limited by the claims, and that workers skilled in the art will recognize that changes may be made in form and detail without departing from the spirit and scope of the invention.

What is claimed:

1. An apparatus for aligning articles formed of generally planar spaced members coupled along an edge of the planar members, said spaced planar members defining an opened end and a closed end along the edge where the planar members are coupled, and the orientation of the opened and closed ends is randomly arranged, comprising:

a conveyor movable along a conveyor path between a first position and a second position for moving articles from the first position to the second position;

a first elongated member extending across a portion of the conveyor between the first and second positions at an elevated height from the conveyor surface, the elevated height defining a gap, the extent of the gap being sized greater than the thickness of the planar members and less than the height of the article formed by the planar members; and a second elongated member extending across a portion of the conveyor, spaced from the first elongated member toward the second position, the second elongated member being supported at an elevated height from the conveyor surface defining a gap, the extent of the gap being sized less than the height of the article formed by the planar members, wherein said first and second members being operatively angled relative to the movement of said conveyor such that depending upon the random orientation of the articles, movement of articles is restricted by the elongated members or articles are flipped under the first elongated member.

2. The apparatus of claim 1 wherein the articles are taco shells.

3. The apparatus of claim 1 wherein the elongated members are formed of an elongated cylindrical shaped rod.

4. The apparatus of claim 1 wherein the conveyor includes first and second sides, and the first and second members extend from the first side to a location spaced from the second side to define a gap between the second side and ends of the first and second members, said ends spaced from the second side defining discharge ends of the first and second members.

5. The apparatus of claim 1 wherein said operative angles for said first and second members are selected such that articles restricted by the elongated members move along the members to a discharge end of the members spaced from a side of the conveyor.

6. The apparatus of claim 5 wherein the angle is between 30–60°.

7. The apparatus of claim 1 wherein the first and second members are substantially parallelly aligned.

8. The apparatus of claim 1 wherein the height of the first and second members is less than the extent of the opening between the spaced planar members at the opened end.

9. The apparatus of claim 1 and further comprising:

a third elongated member spaced from the first and second elongated members, the third elongated member extending across the conveyor at an elevated height from the conveyor surface, the elevated height defining a gap having an extent greater than the thickness of the planar members and less than the height of the articles formed by the planar members wherein the first and second members uniformly align articles for conveyance to the third member and the third member is operatively angled relative to movement of the conveyor, and wherein the uniformly aligned articles are flipped under the third member to an alternate alignment.

10. The apparatus of claim 9 wherein the third elongated member extends between first and second sides of the conveyor at approximately a 75° angle relative to the second side to rotate articles from a first position to a second position.

11. An apparatus for orientating articles formed of generally planar spaced members coupled along an edge of the planar members, said spaced planar members defining an opened end and a closed end along the edge where the planar members are coupled, comprising:

a conveyor movable along a conveyor path between a first position and a second position for moving articles from the first position to the second position; and an elongated member extending across a portion of the conveyor at an elevated height from the conveyor surface, the elevated height defining a gap having an extent greater than the thickness of the planar members and less than the article formed by the planar members, said elongated member being operatively angled relative to the movement of said conveyor, and wherein depending upon the orientation of articles, movement of articles is restricted by the elongated member or flipped under the elongated member.

12. The apparatus of claim 11 wherein the articles are taco shells.

13. The apparatus of claim 11 wherein the elongated member is formed of a cylindrical shaped rod.

14. The apparatus of claim 11 wherein the height of the elongated member is less than the extent of the opening between the spaced planar members at the opened end.

15. An apparatus for aligning randomly organized articles having an opened end and a closed end comprising:

a conveyor movable between first and second position;

a first assembly positioned along the conveyor between the first and second positions for orientating randomly organized articles to a first single uniform direction, the first assembly including a first orientating member for flipping opened end articles to a closed ended position and discharging closed ended articles to a first uniform orientation and a second orientating member spaced from the first orientating member for discharging flipped articles to the first uniform orientation; and a second assembly spaced from the first assembly and positioned along the conveyor between the first and second positions for reorientating the articles from the first uniform direction to a second uniform direction.

16. The apparatus of claim 15 wherein the randomly organized articles are formed of generally planar spaced members coupled along an edge of the planar members and the closed end is formed along the edge where the planar members are coupled wherein:

the first orientation member includes a first elongated member extending across a portion of the conveyor between the first and second positions at an elevated height from a conveyor surface, the elevated height defining a gap, the extent of the gap being sized greater than the thickness of the planar members and less than the height of the article formed by the planar member; and the second orientating member includes a second elongated member between the first and second positions, the second member being spaced from the first member toward the second position and extending across a portion of the conveyor aligned with the first member said first and second members being operatively angled relative to the movement of said conveyor, and wherein depending upon the orientation of the articles, movement of articles is restricted by the elongated members or articles are flipped under the first elongated member.

17. The apparatus of claim 15 wherein the second assembly includes:

an elongated member extending across the conveyor at an elevated height from the conveyor surface, the elevated height defining a gap, the extent of the gap being sized greater than the thickness of the planar members and less than the height of the article formed by the planar members, said elongated member being operatively angled relative to the movement of said conveyor, and wherein articles are restricted by the elongated member and flipped under the elongated member.

18. A method for aligning randomly organized articles along a conveyor, the articles being formed of generally planar spaced members coupled along an edge of the planar members, said spaced planar members defining an opened end and a closed end along the edge where the planar members are coupled, where the orientation of the opened and closed ends is randomly arranged along the conveyor comprising the step of:

providing spaced elongated members along the conveyor for uniformly aligning randomly arranged opened-end and closed-end articles, said members being elevated above the conveyor surface to define a gap therebetween, the extent of the gap of the first elongated member being sized greater than the thickness of the planar members and the extent of the gap of the first and second elongated members being sized less than the height of the article formed by the planar members, wherein depending upon the random orientation of the articles, articles are conveyed along the first elongated member for discharge or are flipped under the first elongated member and conveyed along the second elongated member for discharge;

feeding articles to the conveyor in random orientation; and moving the articles along the conveyor to the members for orientation.

19. The method of claim 18 wherein ends of members are spaced from a side of the conveyor to define discharge ends and further comprising the step of:

moving articles along members to the discharge ends; and rotating the articles at the discharge ends.

20. The method of claim 19 and further comprising the step of:

rotating and flipping articles conveyed from the discharge ends of the spaced elongated members.

* * * * *